Patented Nov. 1, 1932

1,885,509

UNITED STATES PATENT OFFICE

HORACE G. BYERS, OF MONTCLAIR, NEW JERSEY, ASSIGNOR TO RUBBER SERVICE LABORATORIES COMPANY, OF AKRON, OHIO, A CORPORATION OF OHIO

MANUFACTURE OF A VULCANIZED RUBBER PRODUCT

No Drawing.   Application filed August 27, 1926. Serial No. 132,036.

The present invention is directed to the art of manufacturing a vulcanized rubber product by employing as an accelerator of that process, certain pyrimidine derivatives of the type as are hereinafter fully set forth and described. The invention is directed particularly to the use of the alkyl derivatives of the hydrogenated pyrimidines as such vulcanization accelerators.

One example of such a compound is hexa-hydro- 2 methyl-1-3 diphenyl-pyrimidine which has the following formula:

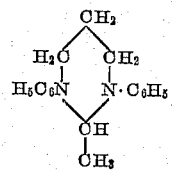

This compound may be manufactured by combining with acetaldehyde the reaction product of four molecular proportions of aniline with one molecular proportion of tri-methylene-dibromide to produce an oily product, tri-methylene-diphenyl-diamine. This reaction is preferably carried out in a container on the water-bath or, in larger scale operations, in a container provided with suitable cooling and temperature controlling means. Aniline bromide, which is a by-product of the reaction may be readily separated from the oily product, by washing with water. The insoluble oil is then treated with one molecular proportion of acetaldehyde. This reaction is comparatively vigorous and may be moderated, if desired, by dissolving the oily tri-methylene-diphenyl-diamine in a suitable solvent, such as ether, adding thereto successive small portions of acetaldehyde until the necessary quantity has been supplied, allowing the reaction to proceed to completion and then removing the solvent together with the water of condensation produced in the reaction by any suitable process, preferably by evaporation under reduced pressure. However, if the reaction be carried out in a water-jacketed container equipped with efficient stirring means, it is not necessary to employ a solvent as described, but the acetaldehyde may be added directly to the oil with stirring while the reacting mass is maintained at a moderate temperature. It is also desirable to provide the container with a reflux condenser in order to return any vaporized aldehyde to the reaction zone. After the reaction has ceased, the water of condensation may be removed from the product in any desirable way, preferably by drying at a temperature below 105° C.

The product so obtained is a dark colored, resin like material readily soluble in dilute hydrochloric acid and precipitated therefrom by the addition of ammonia or other base to the acid solution. Another type of alkyl derivative of hexa-hydro-pyrimidine may be prepared in a similar manner by employing other proportions of the aldehyde than the quantity set forth in the example. Thus, two molecular proportions of acetaldehyde may be used in place of the quantity specified in the example hereinbefore described. It is also possible to employ other primary aromatic amines in place of aniline in the manufacture of accelerating compounds of the type set forth.

It is furthermore possible to obtain other alkyl derivatives of hexa-hydro-pyrimidine by employing formaldehyde, crotonaldehyde, furfur-aldehyde and other highly reactive aliphatic aldehydes in place of the acetaldehyde particularly set forth in the example hereinbefore described. All of the alkyl substituted derivatives of hexa-hydro-pyrimidine mentioned above, have been found to be accelerators of the rubber vulcanization process.

Thus, by way of example, a rubber compound was obtained by mixing in the well known manner, 100 parts of rubber, for example pale crepe rubber, 5 parts of zinc oxide, and 3.5 parts of sulfur, and to this mix, there was added 0.5 parts of any of the alkyl substituted derivatives of hexa-hydro-pyrimidine hereinbefore mentioned. The rubber compound was then vulcanized by heating for approximately forty-five minutes in a press at the temperature given, by forty pounds of steam pressure per square inch. A vulcanized product was obtained in every instance when employing as accelerators any of the alkyl substituted derivatives mentioned. Similarly a vulcanized product was obtained when 1-3 phenyl-2-5 dimethyl-tetra-hydro-pyrimidine was employed as an accelerator. This compound is obtained by treating 1-3 dianilido ethyl-ethylene (1) with acetaldehyde. The following reaction most probably takes place:

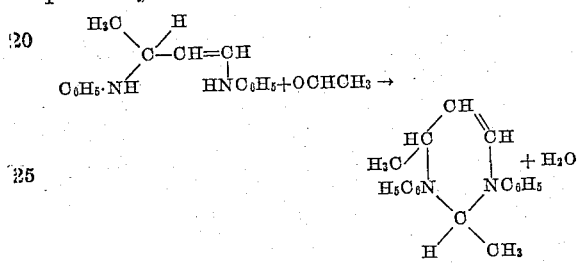

Other accelerators of the type herein disclosed may be readily prepared. Thus, for example, tri-methylene-dibromide was digested for approximately ten hours under pressure with an excess of alcoholic ammonia. After cooling, the container holding the reaction product was opened, the alcohol evaporated therefrom and the dry residuum distilled with a powdered alkali, such as potassium hydroxide. The distillate so obtained was fractionated and the portion boiling between 110 to 140° C. and comprising substantially pure tri-methylene-diamine, was reacted with one molecular proportion of any desired aldehyde, preferably an aliphatic aldehyde, or with a greater proportion of an aldehyde if desired. The product is then freed from water present by any well known process. When acetaldehyde is employed in the process as described, the resulting product is a viscous brownish liquid, and comprises hexa-hydro-2 methyl-pyrimidine. This product as well as similar derivatives obtained by the reaction of other aldehyde than acetaldehyde on tri-methylene-diamine, when compounded in the proportion of 0.5 to 1.0 parts of accelerator in the rubber compound hereinbefore mentioned, have all been found to yield vulcanized rubber products after heating in a press for approximately forty-five minutes at the temperature given by 40 pounds of steam pressure per square inch.

In a similar manner, trimethylene-di-phenyl-diamine has been found to yield vulcanization accelerators when reacted upon with from 1 to 4 molecular proportions of an aliphatic aldehyde, and particularly with acetaldehyde, crotonaldehyde and the like.

It is possible to employ other aldehydes than those particularly set forth in producing derivatives of pyrimidine of the type mentioned. Thus, for example, propion aldehyde, butylaldehyde, heptaldehyde, acrolein and broadly any highly reactive aliphatic aldehyde containing a readily replaceable oxygen atom may be reacted with tri-methylene-diamine and the like to produce pyrimidine derivatives. Furthermore, other methods may be employed, if desired, to produce alkyl derivatives of hydrogenated pyrimidines. My invention is to be understood as comprising the use of such alkyl derivatives as accelerators of the rubber vulcanization process, and this process is not dependent upon the particular means employed for manufacturing the compounds herein claimed as accelerators.

Further, my invention is to be understood as not limited by any theories or statements advanced by way of explanation in discussing the chemical changes involved in the manufacture of the various compounds mentioned, but is to be regarded as limited solely by the following claims, attached hereto as a part of this specification, wherein I intend to claim all novelty inherent in my invention as is permissible in view of the prior art.

What I claim is:

1. The process of manufacturing a vulcanized rubber product which comprises heating a rubber compound containing sulfur in the presence of an alkyl derivative of hexa-hydro-1-3 diphenyl-pyrimidine.

2. The process of manufacturing a vulcanized rubber product which comprises heating a rubber compound containing sulfur in the presence of hexa-hydro-2 methyl 1-3 diphenyl-pyrimidine.

3. The process of manufacturing a vulcanized rubber product which comprises heating a rubber compound containing sulfur in the presence of a relatively small proportion of the compound obtained by reacting an aliphatic aldehyde upon the reaction product of tri-methylene-dibromide with aniline.

4. The process of manufacturing a vulcanized rubber product which comprises heating a rubber compound containing sulfur in the presence of a relatively small proportion of the compound obtained by reacting acetaldehyde upon the reaction product of tri-methylene-dibromide with aniline.

5. The vulcanized rubber product obtained by heating a rubber compound containing sulphur in the presence of an alkyl derivative of hexa-hydro 1-3 diphenyl-pyrimidine.

6. The vulcanized rubber product obtained by heating a rubber compound containing sulfur in the presence of hexa-hydro-2 methyl 1-3 diphenyl-pyrimidine.

7. The process of manufacturing a vulcanized rubber product which comprises heating a rubber compound containing sulfur in the presence of one member of a group of compounds consisting of hexa-hydro-2-methyl-1-3 diphenyl-pyrimidine and hexa-hydro-2-methyl-pyrimidine.

8. The vulcanized rubber product obtained by heating a rubber compound containing sulfur in the presence of one member of a group of compounds consisting of hexa-hydro-2-methyl-1-3 diphenyl-pyrimidine and hexa-hydro-2-methyl-pyrimidine.

In testimony whereof I affix my signature.

HORACE G. BYERS.